INVENTORS
Ralph A. Anderson

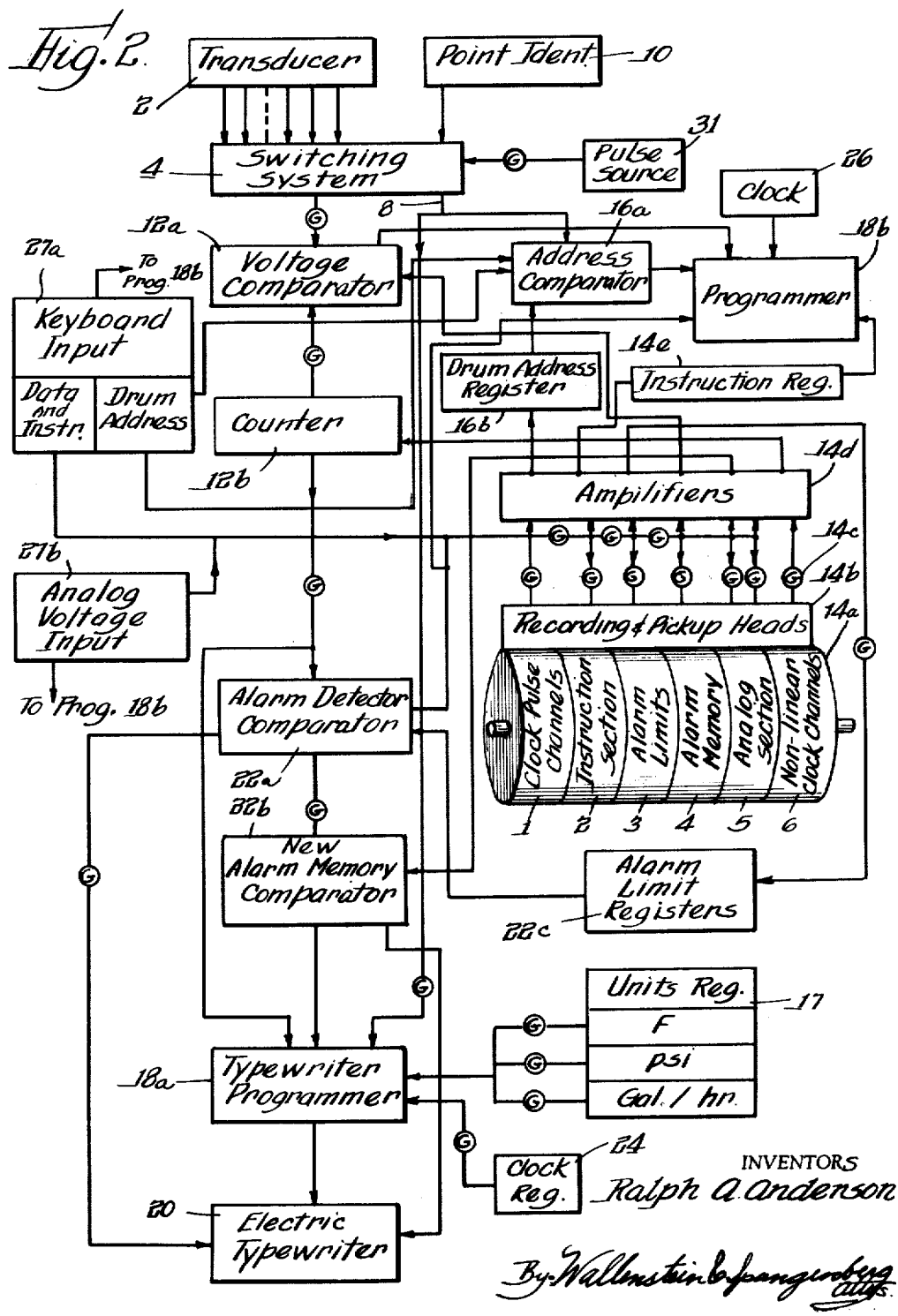

United States Patent Office 2,922,990
Patented Jan. 26, 1960

2,922,990

DATA REDUCTION SYSTEM

Ralph A. Anderson, Deerfield, Ill., assignor, by mesne assignments, to Information Systems, Inc., Skokie, Ill., a corporation of Illinois Application December 20, 1956, Serial No. 630,721

14 Claims. (Cl. 340—174)

The present invention relates to apparatus for monitoring the condition of variables and for recording data on the variables.

This invention concerns itself primarily although not exclusively to a means for monitoring a large number of variables primarily for abnormal conditions, and for placing before an operator large masses of information on both normal and abnormal variables in printed form so that such information can be quickly reviewed.

Although variable monitoring and recording systems have been available for a relatively long period of time, nevertheless the conventional engineering approach to the design of such systems requires, for the most part, installations where a great deal of custom wiring is necessary. This results in high cost of the equipment involved. Furthermore, if a customer desires to substantially vary the order or types of variables to be handled by the system which alters substantially the programming of the various parts of the system, a great deal of work and additional equipment is needed resulting in great additional cost to the customer. This basic approach to the design of alarm scanning and data recording systems heretofore carried on, besides the lack of flexibility and the problems of expense in custom made installations, also left much to be desired in terms of accuracy and reliability.

Among the primary objects of the present invention are to provide a variable monitoring and recording system providing for a much greater standardization of parts, greater flexibility enabling modifications at low cost and greater reliability and accuracy relative to systems performing similar functions heretofore available.

In accordance with the present invention, magnetic storage apparatus has been uniquely applied to the field of variable monitoring and recording.

Before briefly outlining a preferred form of the present invention, the basic requirements therefor will first be outlined. First of all, the system should be capable of scanning variables at a relatively high rate while monitoring for abnormal variables. Variables usually have upper and lower alarm limits, and, customarily, separate preset potentiometers or the like were heretofore provided for each variable so that the outputs of the high and low potentiometer could be compared with a voltage whose magnitude was indicative of the value of the variable involved, so that a determination of the alarm or normal condition of the variable could be determined. Obviously, where a large number of variables are involved a great deal of space and wiring is required for these potentiometers. Furthermore, analog comparison of this type has definite limits of accuracy and resolution.

In order to record the actual values of the variables with a common recording device, it is necessary to convert all signals to a common base so that the data recorded by the recorder indicates the actual numerical values of the variables. Where non-linear primary transducer measuring devices such as thermocouples, are utilized, linearization correction is required. Heretofore, custom designed and wired correction potentiometers and the like were provided for linearization correction. These again were limited accuracy analog devices.

In accordance with a preferred form of the invention, a magnetic drum is utilized to store information on the upper and lower alarm limits of the variables and information which is used to linearize the input data to the system so that a common recording device can respond to signals originating in both non-linear and linear transducers by printing the values of the variables directly in numerical form where an operator can immediately determine the variable values. Further, the drum contains programming information by means of which the system can automatically adjust itself for operation to linear and non-linear transducers without the need for any significant amount of custom wiring. Also, the drum is used to store information on the alarm and normal condition of the variables so that during subsequent scanning interval printout of variable data is provided only for new abnormal variables.

Data on the upper and lower alarm limits is preferably stored in binary decimal coded form on the drum surface, and linearization information is preferably recorded in analog form on the drum. The voltage signals from the transducers are measured and converted into binary decimal coded form. This binary decimal coded information is then compared with the upper and lower alarm limits stored on the drum, and an alarm is given if the comparison indicates that the variable is abnormal. Also, in such case, the binary coded data is used directly or converted into other control signals which control the operation of a recording device, preferably an electric typewriter, which prints on a log sheet information on the time, identification of the variable as by number, and information on the value and units of the abnormal variable.

As each variable is scanned, an instruction is located on the drum corresponding to the variable scanned and the instruction is read out from the drum and the system automatically adjusts itself to operate in accordance with the requirements of the variable scanned. Thus, if a non-linear signal is involved, the system will read out the proper linearization information and the proper units or symbol identifying the kind of variable involved such as pressure, temperature, flow rate, etc. Printout of the values of the variables is provided not only when an abnormal variable is scanned during a monitoring period, but also periodically, such as hourly, where data on all variables are recorded whether or not the variables are abnormal.

Initially, substantially all components of the system may be identical. When equipment is ordered by a particular customer, it is adapted for that particular customer by recording various instructions, alarm limits and linearization correction information corresponding to the variables to be monitored for the customer on the drum. This would usually require little or no additions or changes in the basic system since a keyboard input device may be provided which readily inserts the necessary information into the drum and the system may be initially designed to provide a variety of programs.

As is characteristic of magnetic recording mediums, the recorded information may be changed at will by erasing previously recorded information magnetically and simultaneously inserting new information therein. The number of variables to be scanned may be increased to the full capacity of the drum unless the drum has already been used to its full capacity, this being a rather rare situation since even a very small drum has space for recording information on a much greater number of variables than would be required for the number of variables accommodated by data reduction systems of the type heretofore utilized. When the variables to be accommodated by the system are increased, it may, however, be necessary to insert a scanning switch with a greater number of contact positions, and some additional wiring for programming purposes; but, the degree of change required relative to that required with systems heretofore utilized is relatively insignificant.

Other objects, advantages and features of the invention will become apparent upon making reference to the specification to follow, the claims and drawings wherein:

Fig. 2 is a detailed box diagram of such a system; and

Figure 1:
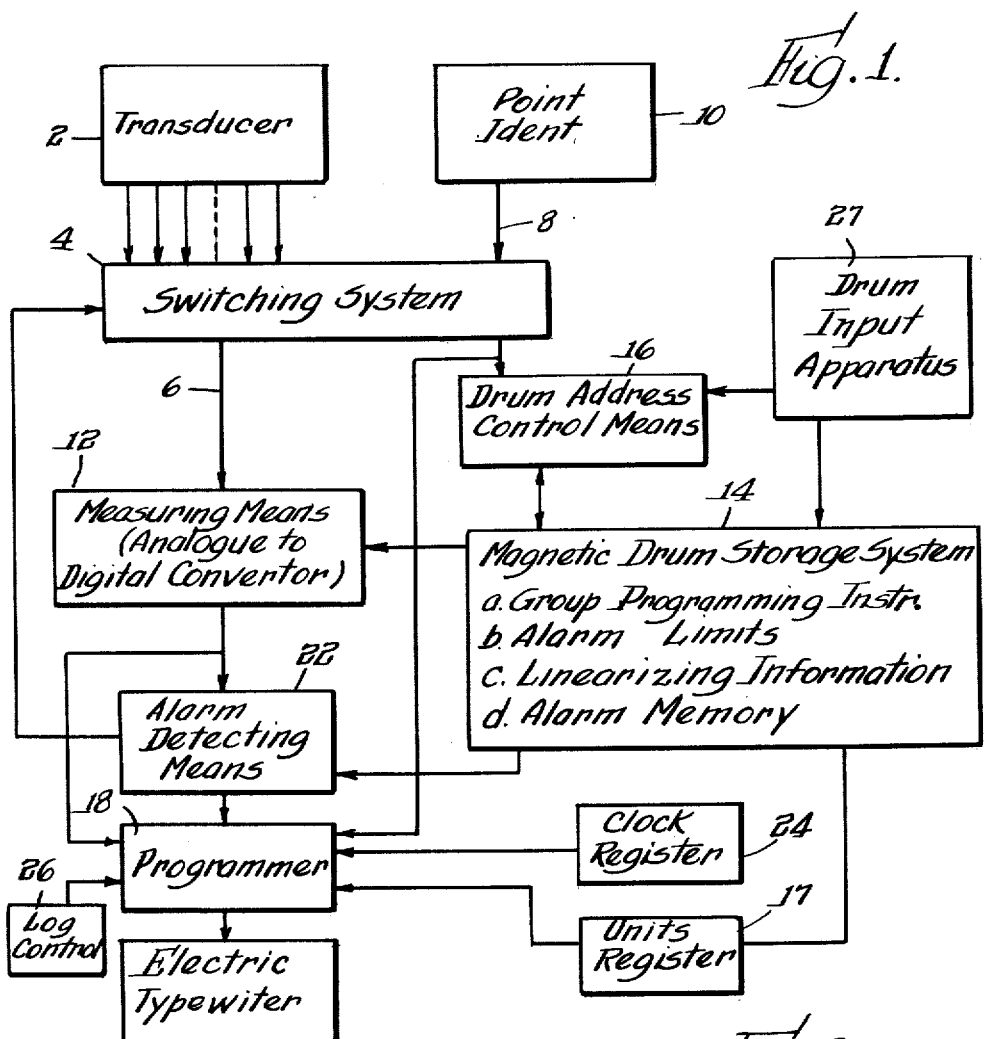
Fig. 1 is a simplified box diagram of the system of the invention.

Refer now more particularly to Fig. 1. The transducers, which are devices such as thermocouples which provide output voltages which are functions of the values of the associated variables, are generally indicated by the reference numeral 2. The thermocouple transducers may be of the type having a substantially non-linear output to input characteristics over the range of temperatures involved, and others may be linear type transducers, such as bellows-operated pressure indicating potentiometers. In the case of the non-linear transducers, the transducers may be of different types, such as Chromel-Alumel or iron-constantan thermocouples which respectively have different non-linear output to input curves. The outputs of the transducers are scanned by a scanning switch system 4 which may be a multi-level telephone type of scanning switch system or other suitable scanning switch system wherein the outputs of the transducers are sequentially connected to the common output 6 of one level of the switching system. Other levels of the switching system may be provided for point identification purposes, in the present case providing a coded output on a line 8, which is indicative of the identification number of the variable involved. A different level of the stepping switch system is provided for each bit or element of a code group, for example, a binary decimal coded group representing the various digits of a number identifying the variable involved. The various contacts of these levels are connected to a coding point identification network 10 or the like providing a voltage or no-voltage condition on the various contacts of the various levels to provide the proper coded output. Such means for identifying through coded information the number of the variable being scanned at a switching system is well known and forms no part per se of the present invention.

The transducer outputs on the line 6 are fed to the measuring means which may include and analog to digital converter, generally indicated by the reference numeral 12. In the broadest aspect of this invention, this may take any one of a number of forms, it being a means for providing a measure of the amplitude of the transducer outputs in terms of a series of binary decimal coded bits of information respectively representing the various digits of a number representing the value of the variable being scanned at any instant. A binary decimal code usually comprises a group of binary units or bits for each digit of the number involved and each group, therefore, represents a number from 0 to 9. Thus, where the bits proceeding from right to left represent numbers to different powers of 2, 00111 represents the number 7.

For linear transducers, the output of the measuring means and digital converter 12 may be obtained directly from the transducer signals or, as in the case of the preferred form of the present invention herein described, is derived with the aid of information stored in a magnetic storage system 14 which is most desirably a system including a magnetic drum recording device of a type heretofore well known. In such case, the magnetic drum acts as an element in the digital conversion process together with the means 12. The use of the drum in this manner is particularly desirable in linearizing the information obtained from the switching system where non-linear transducers are involved. Since a common recording device is utilized to record directly the numerical values of the variables, the non-linear signals should most desirably be converted to linearized data so that the data printed by the recording device directly indicates the actual value of the variable involved, without requiring correction factors and the like. The system automatically feeds the required information from the drum under control, either directly or indirectly, of a drum address control means 16 which in turn is controlled by point identification signals on the line 8 extending from the switching system. Thus, depending upon the particular variable being scanned, the drum address control means 16 sends control signals to the magnetic drum storage system 14 to effect a transfer of the desired information associated with the variable being scanned from the storage drum to a section of the measuring means and analog to digital converter 12. The measuring means and analog to digital converter 12 will be described in more detail in connection with a description of Fig. 2.

Besides the linearization information stored upon the magnetic drum forming part of the magnetic drum storage system 14, group programming instructions in the form of binary decimal coded information is also stored upon the drum for each scanning point and this information is fed out from the drum and is instrumental in controlling feeding of the correct linearization information from the drum. Further, this programming information determines the signals fed from the units register 17 to a typewriter programmer 18 so that if the value of the variable is to be printed, the correct units, such as degrees Fahrenheit, pounds per square inch, etc., or just symbols T and P for temperature and pressure will be printed opposite the number representing the numerical value of the variable.

In the exemplary system now being described, the system periodically, such as hourly, records in numerical form on a log sheet, the values of all variables scanned. Between such regular hourly recording cycles, the system continuously scans for new abnormal variables. Whenever a new abnormal variable is scanned, the scanning ceases until the information is fed through the typewriter programmer 18 to the electric typewriter or other suitable printing device 20 where information identifying the abnormal variable, numerical data on the variable and units of the variable, are printed. Following this, the scanning system again becomes operative, and print-out again occurs only when the new abnormal variable, or in a preferred form of the invention, also a new return to normal condition of a variable is detected. That is, the system, automatically records not only values of new abnormal variables, but also values of variables which have just returned to normal. Since it would be a waste of time to merely repeat recorded information on a particular abnormal variable which continues to be abnormal, the system is adapted to print information only on new abnormal variables, that is the data on the variable when it initially becomes abnormal. In the case where data on all the variables are recorded hourly, it is also desirable to print data on abnormal variables in a different color from that of normal variables so that the abnormal variables can be quickly detected by visually examining the log sheet.

With this as a background, the remainder of the basic box diagram will now be described. The analog to digital converter 12 is fed to a circuit referred to generally as alarm detecting means 22. Under control of the drum address control means 16, a point on the drum is located in which is stored information on the high and low alarm limits of the variable being scanned. This alarm limit information is also fed to the alarm detector means 22. In addition to alarm limit information and the other information outlined above, the drum also contains stored information on the alarm or normal condition of the variable when last scanned. This information is also fed to the alarm detector means. By a comparison of the high and low alarm limit information, the alarm memory information and the value of the variable being scanned, a determination may be made automatically by the alarm detector means as to whether the variable being scanned represents a new abnormal variable, that is a variable which has just become abnormal, or one which has just returned to normal. When the system is only scanning for abnormal variables between the regular, such as hourly, recording cycles, the detection of a new abnormal variable or a variable which has just returned to normal will result in a signal at the output of the alarm detector means which is utilized to control the typewriter programmer 18 or other programmer which controls the feeding of information to the typewriter 20. In such case, the output of the measuring means and analogue to digital converter means 12 is directly or indirectly fed to the typewriter programmer 18 for feeding to the typewriter 20 which will print the numerical value of the new abnormal or return to normal information. Since the recording operation will usually take a longer period than the scanning period of that particular variable, when a new abnormal or return to normal variable is detected, the alarm detector means 22 also stops the scanning of the scanning switch system 4 until after the information has been printed.

When the typewriter programmer 18 is rendered active by the alarm detecting means 22, information from a clock register 24 which indicates time, information on point identification from point identification line 8 and information on units or variable type from the units register 17 are also fed through the typewriter programmer 18 in proper sequence to the electric typewriter so that all of the above-mentioned information on the new abnormal or return to normal variable is printed by the typewriter on a log sheet. As above explained, following such printing, the switching system is again rendered operative whereby it resumes its normal scanning rate looking for new abnormal and return to normal variables.

When the time arrives that the recording of all variables is desired, suitable log control means 26, which may be clock controlled, actuates the typewriter programmer 18 so that information on all variables scanned is fed to the typewriter programmer 18 and then to the electric typewriter where information on all variables is recorded. In such case, information on the identification of the variable data being printed and of the units of such variables are unnecessary since variables may be printed in appropriate columns identified as to units and variable, as in a manner similar to that described in U.S. Patent No. 2,701,748, granted February 8, 1955, to R. A. Anderson on an Automatic Process Logging System.

In the exemplary form of basic system just described, each of the components except for the information stored in the magnetic drum storage system could be identical for any customer desiring a system capable of recording a given number of points or variables. That is, no custom wiring or design would be necessary. This lends itself to relatively inexpensive mass production techniques. The variables to be monitored by the various customers may be different variables or, if the same type of variables, the variables may be scanned in different orders requiring different programming of information. The only part of the new system which need be particularly adapted for a particular customer is the information stored in magnetic drum storage system 14. That is for each different customer different programming instructions, alarm limits, and linearization information would be stored on the drum to suit the requirements of a particular customer. This information may be stored on the drum at the factory or by the customer or by a service man supplied by the manufacturer by means of any suitable drum input apparatus 27. This, for example, may include a keyboard input device with keys representative of digits of numbers and other control keys which when depressed feed the desired information into the drum and record it at the proper place with the aid of the drum address control means 16. If that particular customer desires to utilize the system for new variables or for variables in a different sequence requiring different programming, the system may be adapted to this new environment by recording new information on the magnetic drum. For a more detailed disclosure of the system in Fig. 1, reference should now be made more particularly to Fig. 2 showing a more detailed box diagram of an exemplary system of the present invention. Corresponding elements in Figs. 1 and 2 will be similarly numbered, and in a case where several boxes in Fig. 2 are represented by a single box in Fig. 11, in most instances the same reference numbers have been used followed by reference letters distinguishing the various sections of the component part of the system.

Before other details of the box diagram of Fig. 2 are described, reference to an exemplary layout of the magnetic drum storage system 14 will first be described. As above stated, the storage system preferably utilizes a magnetic drum storage device 14a, that is a storage device comprising a relatively small cylinder on the outside of which there is applied a coating of magnetic material which may assume a neutral and what may be referred to as a positive or negative magnetization. In the illustrated example, the drum is divided up into six axially spaced sections where different respective types of information are stored. Section 1 of the drum contains the clock pulse channels, the pulses in each channel being circumferentially spaced around the drum to provide timing or control pulses which, among other things, are a means for locating different sections and points around the drum. By counting the number of pulses from a reference pulse position, any point on the drum may be located.

The second section of the drum is shown to include programming instruction information, as above explained. In résumé, this information indicates whether the variable being scanned requires linearization and whether if the information is recorded what units are to be printed opposite the numerical value of the variables. Information in this section may be recorded as binary decimal coded information comprising one or more multi-bit groups of information.

The third section of the drum contains similar binary decimal coded bits of information representing high and low alarm limit values of the variables involved. The instruction and alarm limit information for a particular variable can be positioned in the same circumferencial point or section of the drum as the clock pulse which delineates the section of the drum set aside for a particular variable.

The fourth section of the drum contains information on the alarm or abnormal condition of the variable and is accordingly preferably positioned in the same circumferential point of the drum as the corresponding information on that variable just discussed. Since only two conditions of the variable are to be indicated, it can be seen that the mere polarity of the magnetization on the drum indicate the normal or abnormal condition of the variable as previously scanned.

Figure 3:
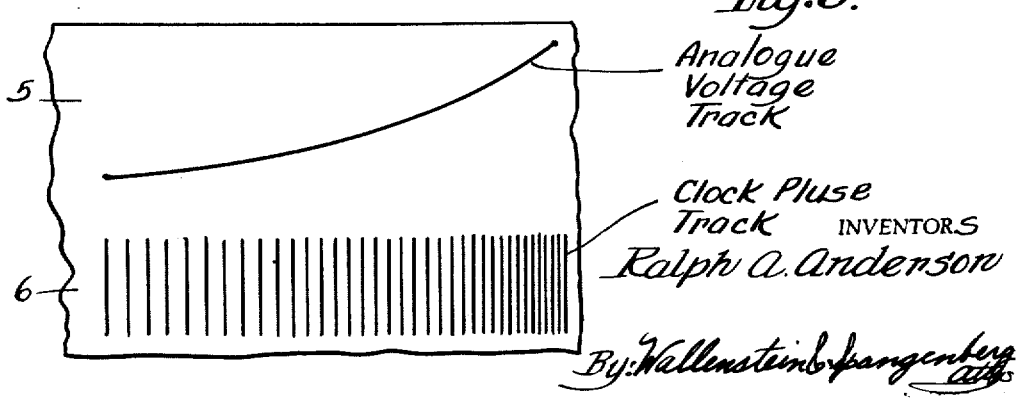
Fig. 3 is a view diagrammatically illustrating the linearization section of the drum.

Section five of the drum preferably contains analog information representing the range of signal values for the various transducers. For a given type of transducer, the drum is rotated past a pick-up head forming part of the assembly and generally indicated by reference numeral 14b wherein a voltage is generated by the signal recorded on the drum of progressively increasing magnitude to match the various possible voltage values of the transducer used to measure the associated variable. Fig. 3 represents diagrammatically parts of sections 5 and 6 of the drum surface, the curve in section 5 representing a variation in flux density circumferentially along a portion of section 5. There will be recorded in section 5 of the drum different groups of such analog information representing, respectively the possible outputs of different types of transducers, both linear and non-linear types.

One of the channels of the clock pulse section 1 of the drum has equally spaced pulses in the same circumferential position as the various groups of analogue information in section 5 of the drum representing outputs of linear transducers, the pluses in the aforementioned channel being so spaced that the number of pulses occupying a given circumferential section of the drum correspond to the numerical value of the variable induced in the pick-up head by the information stored in the corresponding circumferential position of drum section 5. In the case where the transducer output is related non-linearly to the value of the variable, then the clock pulses are spaced in a non-linear manner as in the case with the clock pulses in section 6 of the drum as diagrammatically illustrated in Fig. 3. Alternatively, the clock pulse channel may be a linear arrangement of pulses if correction for non-linearization is made in the analogue information recorded in channel 5. For purposes of illustration it will be assumed that for non-linear variables, a non-linear arrangement of clock pulses in drum section 6 will be utilized for non-linear transducer characteristics. It should be kept in mind, however, that in the broadest aspect of the invention, other means may be utilized for linearization correction by means of information recorded directly on the drum. Also, other arrangements of information on the drum may be utilized without departing from the spirit of the invention.

In the example illustrated, separate recording and pick-up heads are utilized in the various aforementioned sections of the drum and these heads extend to respective amplifiers generally indicated by reference numeral 14d controlled by a programming section 18b. The outputs of the various amplifiers extend to various sections in the system which are to utilize the information in the associated section of the drum. This will be described in more detail hereinafter.

In Fig. 2, the drum address control means 16 includes an address comparator 16a to which is fed coded information on point indentification from the point identification line 8. Also fed to the address comparator 16a is coded information from a drum address register 16b which may be a counting circuit fed by pulses from one of the channels of the clock pulse channel section on the drum 14a. As previously indicated, the count of the clock pulses from a reference position on the drum indicates the circumferential position of the drum opposite the recording and pick-up heads 14b. When the numbers represented by the two codes correspond, the address comparator feeds a control pulse to the programmer 18b which programmer controls the opening of the various gates identified by a circle and letter "G" throughout the system illustrated in Fig. 2. Thus, upon correspondence of the address codes, the pulse or signal fed to the programmer 18b by the comparator 16a causes the programmer to momentarily open the gate controlling signals from the instruction section 2 of the drum. Thus, the instruction corresponding to the variable being scanned is fed from the recording and pick-up head or heads associated with that section of the drum through the then open gate circuit and the amplifiers 14d to an instruction register 14e which serves as buffer storage for the instruction. This is necessary because the drum is continuously rotated and information on the instruction must be continuously available while being acted upon.

The output of the instruction register controls the programmer 18b which opens the proper gate associated with the pick-up head opposite the analog section 5 of the drum to transfer the progressively increasing signal voltage corresponding to the transducer which is scanned at any instant. It is assumed for sake of illustration that in the analog drum section 5 there is a separate axial section of the drum set aside for each different type of transducer. Control signals fed from the instruction register 14e to the programmer 18b will also result in the opening of the gate controlling the feeding of clock pulses in a particular channel on the drum which pulses are to be counted by counter 12b. Thus, if a non-linear transducer is being scanned, the gate associated with the non-linear clock pulse channel in section 6 of the drum will be opened to feed proper pulses from the drum, or, alternatively, where a linear transducer is involved, the proper clock pulse channel in section 1 of the drum is rendered active by opening the gate associated with the particular channel involved when the reference or start position of the drum reaches the pickup- heads 14b. The magnetized areas in the various tracks of analog section 5 of the drum begin at the reference or start point on the drum so that the pulse counting operation is synchronized with the generation of the progressively increasing voltage in the pick-up heads of drum section 5.

The progressively increasing voltage fed from the analog section 5 of the drum after being fed through one of the amplifiers in amplifier section 14d is fed to a voltage comparator circuit 12a to which also is fed the output of the transducer being scanned by the scanning switch system 4. When the magnitude of the voltage fed from the switching system and from the analog section of the drum correspond, the voltage comparator feeds a stop pulse to the pulse counter 12b to which are fed pulses from the then active clock pulse channel. As the counting of the pulses terminates upon correspondence of the voltages fed to the voltage comparator, the pulse count in the counter 12b, for reasons outlined above, is a measure of the actual value of the variable scanned. Pulse counter 12b may be of a type which provides a binary decimal coded output which corresponds to the binary decimal code utilized in recording the upper and lower alarm limits on the drum 14a.

The output of the counter 14b is fed to an alarm detector comparator circuit 22a. When the voltage comparator detects coincidence of the compared voltages, programmer 18b is rendered operative to open the gate or gates associated with the drum alarm limit section 3 when the count of the drum address register 16b and the point identification information fed to the address comparator 16a again are in coincidence, which results in the transfer from section 3 of the drum of information on the upper and lower alarm limits of the variable involved through the amplifiers 14d and then to an alarm limit register 22c whose output is coupled to the alarm detector comparator 22a. The alarm detector comparator 22a may be any well known type of computing element which subtracts the binary decimal coded signals derived from the counter 12b from the upper and lower alarm limit separately stored in alarm limit register 22c. Obviously, the magnitude and sign of the subtraction process will indicate whether the variable is abnormal or normal. If the variable is abnormal, the alarm detector comparator feeds a suitable signal to the programmer 18b which programmer then, under control of the address comparator 16a, opens the gate opposite the alarm memory section 4 of the drum to record at a proper point on the drum a signal indicating an abnormal variable. Just before such recording, however, the original signal in the alarm memory section is transferred out through an open gate and through the amplifiers 14a and to a new alarm memory comparator circuit 22b. Simultaneously, the programmer 18b opens the gate extending from the alarm detector comparator 22a to the alarm memory comparator 22b to transfer an alarm-indicating signal if the alarm detector comparator has detected an abnormal variable. If the signal fed from the alarm memory section 4 to the alarm memory comparator 22b indicated that the variable when previously scanned was normal, then the alarm memory comparator 22b has detected a new abnormal variable and the alarm memory comparator 22b transfers a control signal to the programmer 18b indicating a new abnormal variable. This programmer then opens a gate circuit which transfers the output of counter 12b which is indicative of the value of the variable to the typewriter programmer 18a which, at the proper time, in turn feeds control signals to the typewriter 20 for typing the numerical value of the variable. If no new abnormal variable is detected, then no printout of variable data at that time occurs.

In a similar manner, if the alarm detector comparator 22a indicates that the variable being scanned is normal, and the information fed from the alarm memory section 4 of the drum to the new alarm memory comparator 22b indicates that the variable involved was previously abnormal, then the new alarm memory comparator circuit 22b directly or indirectly operates the typewriter programmer 18a to printout the value of such variable as determined by the count stored in counter 12b. The condition of the variable detected by alarm detector comparator 22a is fed into the alarm memory section 4 of the drum.

When the programmer 18b receives a signal indicating a new abnormal or return to normal condition of the variable, the programmer sequentially feeds to the electric typewriter time information from the clock register 24, point identification information from the point identification line 8, information on the value of the variable from the counter 12b and information on the units or variable type from the units register 17. The gate leading to the proper section of the units register to provide the proper units is under control of the signals fed from the instruction register 14e to the programmer 18b.

During a new abnormal or return to normal condition, the programmer 18b closes a gate extending from pulses source 31 to the switching system 4 to stop the switching system. The closure of the latter gate continues until the electric typewriter has completed printing the various above-mentioned information on a log sheet. Then, the typewriter programmer 18a feeds a suitable pulse to the programmer 18b which in turn opens the gate extending from the pulse source 31 to the switching system 4 to continue the scanning operation.

Regularly, such as hourly, recording of data on substantially all variables takes place. At that time, when a clock control means 26 feeds a suitable control pulse to the programmer 18b which effects the feeding of the output of counter 12b to the typewriter programmer 18a for printout for each variable scanned in the cycle involved, independently of whether a new alarm or new return to normal condition exists. In such case, the alarm detector comparator 22a may be rendered operative in the manner above explained so that the detection of any abnormal variable results in the feeding of a signal from the alarm detector comparator to the electric typewriter 20 to effect recording or printing in a different colored type than for normal variables. A new alarm memory comparator circuit 22b need not be operative during the regular cycles.

It should be understood that even the exemplary embodiment of the invention above described may be modified in various ways without deviating from the broader aspects of the invention. For example, the particular disclosed method of converting the analog signals from the transducers to binary decimal coded information by voltage comparison and pulse counting operations may be modified to some other analog to digital conversion method well known in the art.

I claim as my invention:

1. In a data reduction system including an input portion including transducer means associated with respective variables, at least some of said transducer means being of a type having a non-linear input to output characteristic, input switching means for sequentially feeding the outputs of said transducer means to data handling means, and an output portion including output recording means for recording data on the variables, data handling means connected between said input switching means and said recording means comprising: magnetic storage means having stored therein data on the alarm limits of each of the variables associated with said transducers, instructions for rendering active linearizing sections of the storage means and data on possible measured values of the variables associated with the non-linear transducers together with linearizing correction data for effectively linearizing the output of the non-linear transducers, means responsive to an instruction indicating that a non-linear transducer is being scanned and responsive to the apparent data value obtained from the scanned transducer for locating the corresponding stored data value in said storage means and for initiating readout of the associated linearizing correction data from said storage means to provide linearized data, means responsive to the value of the variable being scanned and to the corresponding alarm limit data in the storage means for detecting an abnormal variable, and means responsive to an abnormal condition of a variable for effecting the recording of the linearized value of the abnormal variable.

2. In a data reduction system including an input portion including transducer means associated with respective variables, at least some of said transducer means being of a type having a non-linear input to output characteristic, input switching means for sequentially feeding the outputs of said transducer means to data handling means, and an output portion including output recording means for recording the data, data handling means connected between said input switching means and said recording means comprising: magnetic storage means having stored therein instructions for rendering active linearizing sections of the storage device and data on possible measured values of the variables associated with the non-linear transducers together with linearizing correction data for effectively linearizing the output of the non-linear transducers, means responsive to an instruction indicating that a non-linear transducer is being scanned and responsive to the apparent data value obtained from the scanned transducer for locating the corresponding stored data value in said storage means and for initiating readout of the associated linearizing correction data from said storage means to provide linearizing data, and means for effecting the recording of the linearized value of the variable.

3. A data reduction system for handling data on a large number of variables said system including a magnetic storage means having stored therein data on alarm limits of the variables and linearizing correction data for variables measured with transducers having non-linear input to output characteristics, recording and readout head means for recording data on and reading data from said magnetic storage means, data input means for effecting the entry of alarm limit and linearizing correction data in said storage means, means for feeding data on said variables successively to a common output, means responsive to data at said common output obtained from a non-linear transducer and to corresponding linearizing data on said drum storage means for providing a linearized output for the variable involved, an output recording device, and means responsive to data at said common output and corresponding alarm limit data in said drum storage means for initiating an alarm and readout of abnormal data to said output recording device when an abnormal variable is scanned.

4. In a variable monitoring and recording system including an input portion including transducer means associated with respective variables, at least some of said transducer means being of a type having a non-linear input to output characteristic, and an output portion including output recording means for recording numerical data on the variables, data handling means connected between said transducer means and said recording means comprising: magnetic storage means having stored therein data on the alarm limits of each of the variables associated with said transducers, instructions for rendering active linearizing sections of the storage device and data on possible measured values of the variables associated with the non-linear transducers together with linearizing correction data for effectively linearizing the output of the non-linear transducers, means responsive to an instruction indicating that a non-linear transducer is being scanned and responsive to the apparent data value obtained from the scanned transducer for locating the corresponding stored data value in said magnetic storage means and for initiating readout of the associated linearizing correction data from said storage means to provide resultant linearized data, means responsive to the value of the variable being scanned and to the corresponding alarm limit data in the storage means for detecting an abnormal variable, and means responsive to an abnormal condition of a variable for effecting the recording of the linearized numerical value of the abnormal variable.

5. In a variable monitoring and recording system including an input portion including transducer means associated with respective variables, at least some of said transducer means being of a type having a non-linear input to output characteristic, and an output portion including output recording means for recording numerical data on the variables, data handling means connected between said transducer means and said recording means comprising: magnetic storage means having stored therein instructions for rendering active linearizing sections of the storage device and data on possible measured values of the variables associated with the non-linear transducers together with linearizing correction data for effectively linearizing the output of the non-linear transducers, means responsive to an instruction indicating that a non-linear transducer is being scanned and responsive to the apparent data value obtained from the scanned transducer for locating the corresponding stored data value in said magnetic storage means and for initiating readout of the associated linearizing correction data from said storage means to provide resultant linearized data, and means for effecting the recording of the linearized numerical value of the variable.

6. Means for providing a coded signal indicative of the amplitude of an input voltage signal comprising: a magnetic storage medium and pick-up means into which a voltage is induced upon relative movement between the storage medium and pick-up means, said storage medium having magnetized areas thereon which progressively vary in magnetic intensity along the path of relative movement between the pick-up means and storage medium to provide a progressively increasing induced signal voltage in said pick-up means, said storage medium also having a clock pulse channel having a large number of pulse-producing magnetized areas thereon spaced to induce in said pick-up means a number of pulses which is a function of the change in amplitude of the voltage induced in said pick-up means during the same period involved, means for comparing said input voltage signal and the progressively increasing induced signal voltage in said pick-up means, and counter means for counting the number of pulses induced in said pick-up means from a reference time to the time when said comparing means detects coincidence between said input voltage signal and said induced signal voltage.

7. In a variable monitoring and recording system including an input portion including transducer means associated with respective variables and analogue to digital converter means coupled to the outputs of said transducer means for providing digital signals representative of the values of the variables, and an output portion including indicating means for indicating the condition of the variables, data handling means connected between said transducer means and said indicating means comprising: magnetic storage means having stored therein digital data on alarm limits of the variables associated with said transducer means, means for sequentially providing digital signals derived from said respective transducer means by said analogue to digital converter means and corresponding digital signals representing the alarm limit data on the associated variables stored in said magnetic storage means, and control means responsive to said digital signals for operating said indicating means when a variable turns abnormal.

8. In a variable monitoring and recording system including an input portion including transducer means associated with respective variables and analogue to digital converter means coupled to the outputs of said transducer means for providing digital signals representative of the values of the variables, and an output portion including indicating means for indicating the conditions of the variables, data handling means connected between said transducer means and said indicating means comprising: magnetic storage means having stored therein digital data on alarm limits of the variables associated with said transducers and condition information on the last detected conditions of the variables, means for providing digital signals derived from said respective transducer means by said analogue to digital converter means and corresponding digital signals representing alarm limit data and said condition information stored in said magnetic storage means, and control means responsive to said digital signals for operating said indicating means whenever a variable initially changes from a normal to an abnormal condition, to indicate new abnormal variables, and for modifying the corresponding condition information in said magnetic storage means whenever a change in the condition of a variable changes between a normal and an abnormal condition.

9. In a variable monitoring and recording system including an input portion including transducer means associated with respective variables and analogue to digital converter means coupled to the outputs of said transducer means for providing digital signals respresentative of the values of the variables, and an output portion including indicating means for indicating the condition of the variables, data handling means connected between said transducer means and said indicating means comprising: magnetic storage means having stored therein digital data on alarm limits of the variables associated with said transducers, manually operable keyboard input means for erasing said alarm limit data and inserting new data therefor, means for sequentially providing digital signals derived from said respective transducer means by said analogue to digital converter means and corresponding digital signals from the alarm limit data stored in said magnetic storage means, and control means responsive to said sequentially provided signals for operating said indicating means when a variable turns abnormal.

10. In a variable monitoring and recording system including an input portion including transducer means associated with respective variables and analogue to digital converter means coupled to the outputs of said transducer means for providing electrical digital signals representative of the values of the variables, and an output portion including printing means for printing the values of the variables, data handling means connected between said transducer means and said printing means comprising: magnetic storage means having stored therein digital data on alarm limits of the variables associated with said transducers and condition information on the last detected conditions of the variables, means for converting the magnetically stored data in said magnetic storage means to electrical digital signals, means for sequentially providing digital signals derived from said respective transducer means by said analogue to digital converter means and corresponding digital signals from the alarm limit data and said condition information stored in said magnetic storage means, and control means responsive to said sequentially provided signals for operating said printing means whenever a variable initially changes from a normal to an abnormal condition to print out only information on new abnormal variables, and for modifying the corresponding condition information in said magnetic storage means whenever a change in the condition of a variable changes between a normal and an abnormal condition.

11. The variable monitoring and recording system of claim 7 wherein said transducer means are associated with different types of variables, said storage means having instruction information which identifies the different types of variables for which there are different data handling requirements, means for feeding instruction information from said storage means corresponding to the variable whose digital signals are then being handled by the system, and programming means responsive to the latter instruction information for carrying out the particular data handling requirements for the particular type of variable involved.

12. The variable monitoring and recording system of claim 11 wherein there is provided manually operable input means for changing said alarm limit data and instruction information in said storage means.

13. The variable monitoring and recording system of claim 7 wherein there is provided manually operable input means for changing said alarm limit data in said storage means.

14. The variable monitoring and recording system of claim 7 wherein said digital signals are binary decimal coded signals.

References Cited in the file of this patent

UNITED STATES PATENTS 2,737,342     Nelson _____ Mar. 6, 1956